(12) United States Patent
Bae et al.

(10) Patent No.: US 9,769,145 B2
(45) Date of Patent: Sep. 19, 2017

(54) METHOD AND APPARATUS FOR CONNECTING TO ONLINE SERVICE

(75) Inventors: Joo-yoon Bae, Seoul (KR); Hun Lee, Seoul (KR); Cheol-hoi Kim, Seoul (KR); Ji-hoon Choi, Seoul (KR)

(73) Assignee: Samsung Electronics Co., Ltd (KR)

( * ) Notice: Subject to any disclaimer, the term of this patent is extended or adjusted under 35 U.S.C. 154(b) by 242 days.

(21) Appl. No.: 13/226,958

(22) Filed: Sep. 7, 2011

(65) Prior Publication Data

US 2012/0060208 A1    Mar. 8, 2012

(30) Foreign Application Priority Data

Sep. 7, 2010  (KR) .................. 10-2010-0087663

(51) Int. Cl.
*H04L 29/06*  (2006.01)
(52) U.S. Cl.
CPC .............................. *H04L 63/0815* (2013.01)
(58) Field of Classification Search
CPC ..... G06F 21/41; H04L 63/083; H04L 9/0863; H04L 9/3228
See application file for complete search history.

(56) References Cited

U.S. PATENT DOCUMENTS

| | | | | |
|---|---|---|---|---|
| 6,006,333 A * | 12/1999 | Nielsen | ................... | G06F 21/41 709/203 |
| 6,799,272 B1 * | 9/2004 | Urata | ................... | H04L 9/0866 713/169 |
| 7,136,490 B2 * | 11/2006 | Martinez | ................. | G06F 21/31 380/284 |
| 7,137,006 B1 * | 11/2006 | Grandcolas | ............ | G06F 21/41 713/180 |
| 7,155,739 B2 * | 12/2006 | Bari | ....................... | G06F 21/41 705/26.41 |
| 7,577,659 B2 | 8/2009 | Schutz et al. | | |
| 8,255,984 B1 * | 8/2012 | Ghostine | ................ | G06F 21/41 709/217 |
| 2003/0149781 A1 * | 8/2003 | Yared | ..................... | G06F 21/41 709/229 |
| 2004/0133812 A1 * | 7/2004 | Ohmori | ................... | G06F 21/31 726/18 |

(Continued)

FOREIGN PATENT DOCUMENTS

JP    2004-145499    5/2004
JP    2007-293760    11/2007

(Continued)

OTHER PUBLICATIONS

Korean Office Action dated Dec. 21, 2016 issued in counterpart application No. 10-2010-0087663, 9 pages.

(Continued)

*Primary Examiner* — Trang Doan
(74) *Attorney, Agent, or Firm* — The Farrell Law Firm, P.C.

(57) ABSTRACT

A method of connecting to an online service where a terminal transmits information regarding a selected online service and first authentication information to an external device, receives second authentication information detected based on the transmitted information, from the external device, and is then logged into the selected online service based on the received second authentication information.

32 Claims, 4 Drawing Sheets

(56) References Cited

U.S. PATENT DOCUMENTS

| | | | |
|---|---|---|---|
| 2004/0158746 A1* | 8/2004 | Hu | G06F 21/41 |
| | | | 726/8 |
| 2005/0091539 A1 | 4/2005 | Wang et al. | |
| 2005/0177731 A1* | 8/2005 | Torres | H04L 67/02 |
| | | | 713/182 |
| 2007/0044143 A1 | 2/2007 | Zhu et al. | |
| 2007/0294752 A1* | 12/2007 | Kinser | G06F 21/33 |
| | | | 726/8 |
| 2008/0031447 A1* | 2/2008 | Geshwind | H04L 9/0822 |
| | | | 380/46 |
| 2008/0218806 A1* | 9/2008 | Yokokura | H04N 1/00222 |
| | | | 358/3.28 |
| 2008/0235779 A1* | 9/2008 | Bogner | H04L 63/0815 |
| | | | 726/8 |
| 2009/0007248 A1* | 1/2009 | Kovaleski | G06F 21/33 |
| | | | 726/8 |
| 2009/0126000 A1* | 5/2009 | Andreev | H04L 63/0815 |
| | | | 726/8 |
| 2009/0172795 A1* | 7/2009 | Ritari | H04L 63/0815 |
| | | | 726/7 |
| 2009/0199276 A1 | 8/2009 | Schneider | |
| 2009/0328165 A1* | 12/2009 | Cook | G06F 21/445 |
| | | | 726/6 |
| 2010/0017334 A1* | 1/2010 | Itoi | G06Q 20/02 |
| | | | 705/71 |
| 2010/0250330 A1* | 9/2010 | Lam | G06Q 30/02 |
| | | | 705/59 |
| 2011/0072493 A1* | 3/2011 | Morishita | G06F 21/31 |
| | | | 726/3 |
| 2011/0202988 A1* | 8/2011 | Otranen | H04L 9/3213 |
| | | | 726/8 |

FOREIGN PATENT DOCUMENTS

| | | |
|---|---|---|
| KR | 1020000072346 | 12/2000 |
| KR | 1020050086106 | 8/2005 |
| KR | 1020090070768 | 7/2009 |

OTHER PUBLICATIONS

European Search Report dated Aug. 9, 2017 issued in counterpart application No. 11823744.5-1853, 15 pages.

* cited by examiner

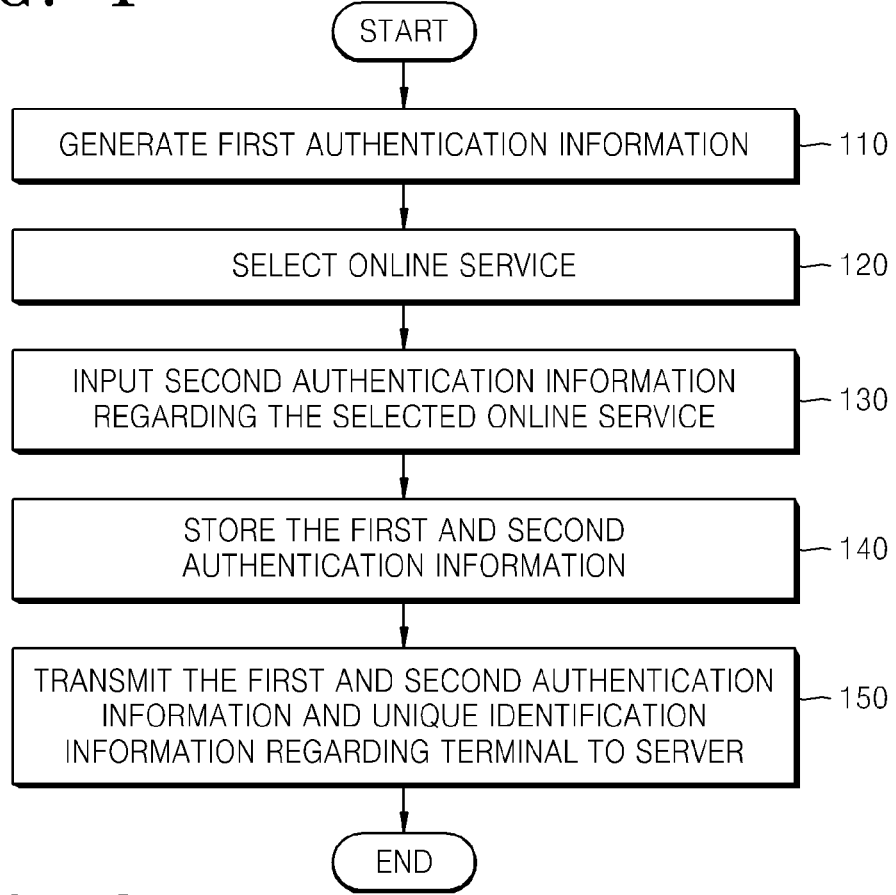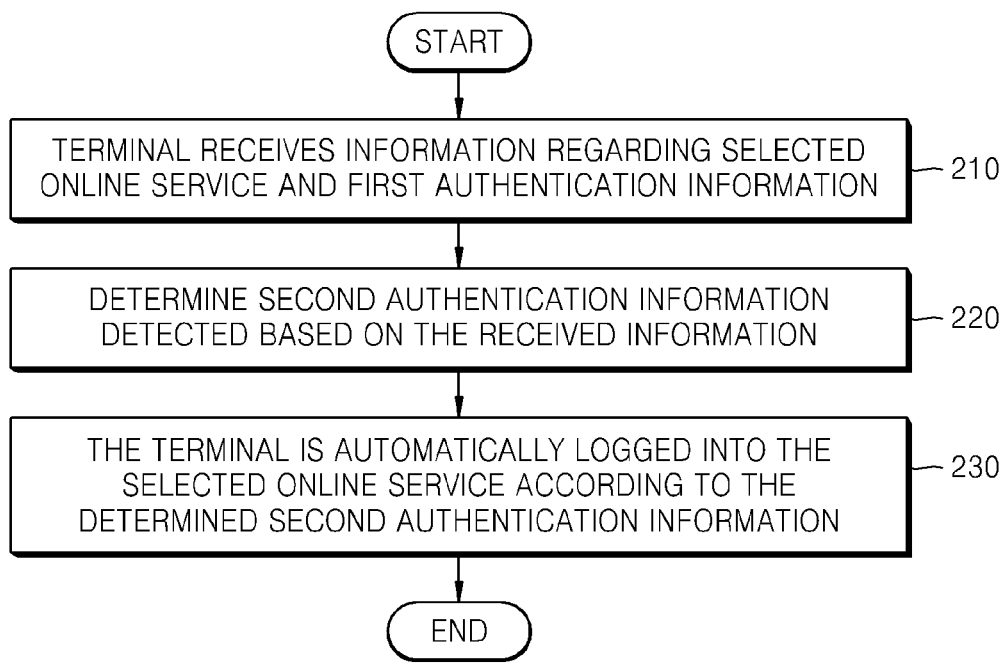

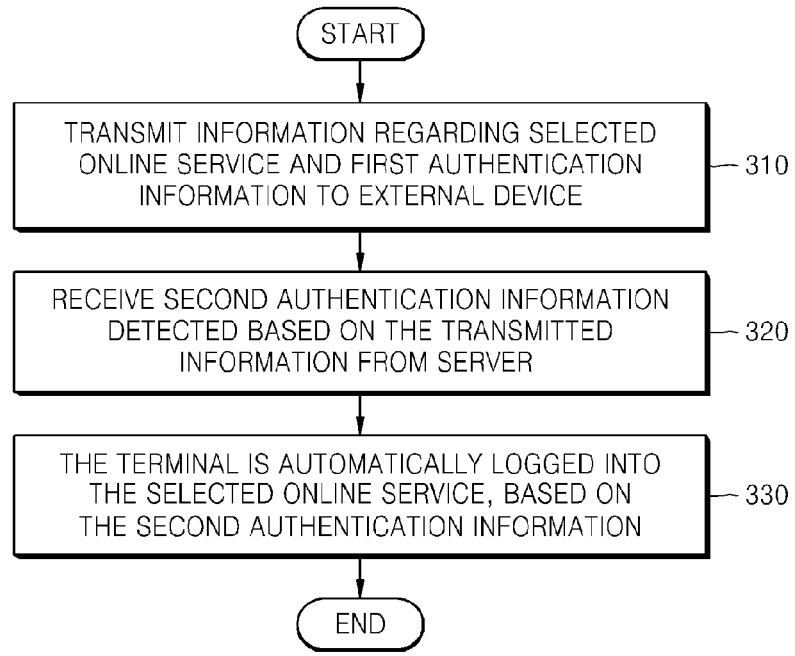
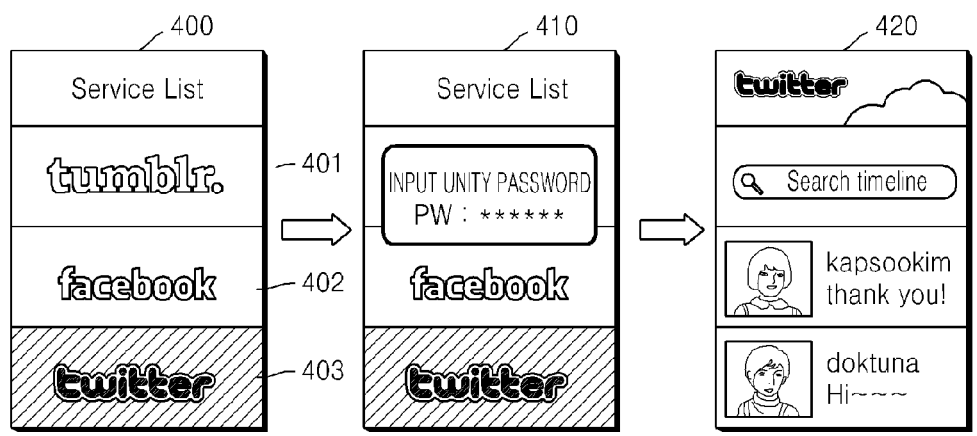

METHOD AND APPARATUS FOR CONNECTING TO ONLINE SERVICE

PRIORITY

This application claims priority under 35 U.S.C. §119 to a Korean Patent Application No. 10-2010-0087663, which was filed on Sep. 7, 2010, in the Korean Intellectual Property Office, the entire disclosure of which is incorporated herein in its entirety by reference.

BACKGROUND OF THE INVENTION

1. Field of the Invention

The present invention relates generally to a method and apparatus for connecting to online services, and more particularly, to a method and apparatus for connecting to online services, whereby a user is capable of being automatically logged into a plurality of online services by using a single password.

2. Description of the Related Art

Various services to which users can connect online at any time, place, or with any type of device have increased and the amount of information needed to use the services, e.g., an IDentification (ID) and a password, has also increased. The more services are used, the more IDs and passwords have to be remembered by the user. If a user owns a plurality of devices for connecting to services, the user will be inconvenienced even more by having to input log-in information each time any of the plurality of devices connects to a service.

SUMMARY OF THE INVENTION

Accordingly, the present invention has been made to solve the above-mentioned problems, and to provide at least the advantages as described below. An aspect of the present invention provides methods and apparatuses for connecting to online services, whereby a user may log into internet online services via plurality of devices by simply inputting a single password without having to repeatedly perform a log-in operation by inputting IDs and passwords individually for the plurality of devices, and for performing data synchronization by using a communication network between devices or between a device and a server.

According to an aspect of the present invention, there is provided a method of connecting to an online service, performed by a terminal, the method including transmitting information regarding a selected online service and first authentication information to an external device, receiving second authentication information detected based on the transmitted information, from the external device, and logging into the selected online service, based on the received second authentication information.

According to another aspect of the present invention, there is provided a method of connecting to an online service, the method including receiving information regarding a selected online service and first authentication information from a terminal, detecting second authentication information for logging into the selected online service, based on the received information, and transmitting the detected second authentication information to the terminal.

According to another aspect of the present invention, there is provided a method of connecting to an online service, performed by a terminal, the method including receiving information regarding a selected online service and first authentication information, determining second authentication information detected based on the received information, and logging into the selected online service based on the determined second authentication information.

According to another aspect of the present invention, there is provided a method of connecting to an online service, the method including receiving information regarding at least one online service, first authentication information, and second authentication information regarding the at least one online service from a terminal, storing the received information regarding the at least one online service, first authentication information, and second authentication information regarding the at least one online service, and if the first authentication information is received from an external terminal, transmitting the stored information and the second authentication information regarding the at least one online service to the external terminal.

According to another aspect of the present invention, there is provided an apparatus for connecting to an online service, the apparatus including a transmitter for transmitting information regarding a selected online service and first authentication information to an external device, a receiver for receiving second authentication information detected based on the transmitted information, from the external device, and a controller for logging into the selected online service, based on the received second authentication information.

According to another aspect of the present invention, there is provided an apparatus for connecting to an online service, the apparatus including a receiver for receiving information regarding a selected online service and first authentication information from a terminal, a controller for detecting second authentication information for logging into the selected online service, based on the received information, and a transmitter for transmitting the detected second authentication information to the terminal.

According to another aspect of the present invention, there is provided an apparatus for connecting to an online service, the apparatus including a receiver for receiving information regarding a selected online service and first authentication information, and a controller for determining second authentication information detected based on the received information, and logging into the selected online service based on the determined second authentication information.

According to another aspect of the present invention, there is provided an apparatus for connecting to an online service, the apparatus including a receiver for receiving information regarding at least one online service, first authentication information, and second authentication information regarding the at least one online service from a terminal, a database for storing the received information regarding the at least one online service, first authentication information, and the second authentication information regarding the at least one online service, a controller for detecting the information and second authentication information regarding the at least one online service, which are stored in the database, when the receiver receives the first authentication information from an external terminal, and a transmitter for transmitting the detected information and second authentication information to the external terminal.

BRIEF DESCRIPTION OF THE DRAWINGS

The above and other features and advantages of the embodiments of the present invention will be more apparent from the following description taken in conjunction with the accompanying drawings in which:

FIG. 1 is a flowchart illustrating a method of registering a unity password, according to an embodiment of the present invention;

FIG. 2 is a flowchart illustrating a method of connecting to an online service, according to an embodiment of the present invention;

FIG. 3 is a flowchart illustrating a method of connecting to an online service, according to another embodiment of the present invention;

FIG. 4 is a diagram, which illustrates interface screens displaying a method of connecting to an online service, according to an embodiment of the present invention;

DETAILED DESCRIPTION OF THE EMBODIMENTS OF THE PRESENT INVENTION

Figure 5:
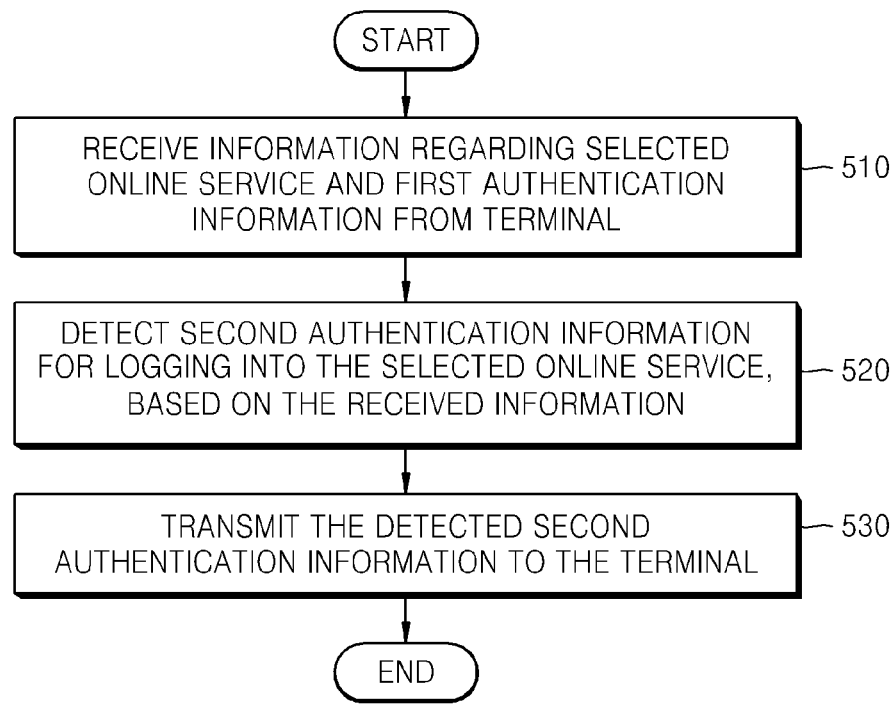
FIG. 5 is a flowchart illustrating a method of connecting to an online service, according to another embodiment of the present invention.

Hereinafter, the present invention will be described in greater detail with reference to the accompanying drawings in which aspects of the present invention are illustrated. In the following description, same or similar drawing reference numerals are used for the same or similar elements throughout the drawings.

FIG. 1 is a flowchart illustrating a method of registering a unity password, according to an embodiment of the present invention. Referring to FIG. 1, in step 110, a user generates first authentication information. The first authentication information may be a unity password. In an embodiment of the present invention, the unity password may be a password whereby a user may automatically log into a plurality of online services without having to input a plurality of pieces of authentication information corresponding to the online services.

In step 120, the user selects an online service that may be supported by a terminal.

In step 130, the user inputs second authentication information regarding the selected online service. The second authentication information may be an ID and a password for logging into the selected online service. The ID may be a user name or an email account according to the type of online service. If the user's ID and password have already been stored, the user may change the stored ID and password by inputting new second authentication information.

In step 140, the input first authentication information and second authentication information are stored in the terminal in the form of a data field.

In step 150, the terminal transmits the first authentication information, the second authentication information, and unique ID information thereof to a server. If the terminal is a mobile device, the unique ID information may be telephone numbers. Then, after the server completes authentication of the terminal, the first authentication information, the second authentication information, and the unique ID information are stored in a database of the server in the form of a data field. The authentication may be performed by using a Short Message Service (SMS) or e-mail.

FIG. 2 is a flowchart illustrating a method of connecting to an online service, according to an embodiment of the present invention. Referring to FIG. 2, in step 210, a terminal receives an input signal containing information regarding a selected online service and first authentication information. The information regarding the selected online service may be a selection signal indicating that the online service is selected to be logged into. The first authentication information may be a unity password.

In step 220, the terminal determines second authentication information detected based on the received information. Specifically, the terminal performs user authentication according to the first authentication information, and then determines second authentication information corresponding to the selected online service from among second authentication information regarding online services, which is stored therein. The second authentication information may be an ID and password for logging into the selected online service.

In step 230, the terminal is automatically logged into the selected online service according to the determined second authentication information.

In the current embodiment, a user may be automatically logged into a plurality of online services by simply inputting a unity password only once without having to individually input IDs and passwords for the plurality of online services. For example, if the user selects an online service B from among online services A, B, and C to which the terminal is allowed to be connected and inputs the unity password to log into the online service B, then the user is automatically logged into the online service B.

FIG. 3 is a flowchart illustrating a method of connecting to an online service, according to another embodiment of the present invention. In FIG. 3, a terminal is automatically logged into an online service by receiving second authentication information from a server, unlike in FIG. 2 in which the terminal itself determines the second authentication information.

Referring to FIG. 3, in step 310, the terminal transmits information regarding a selected online service and first authentication information to an external device, e.g., the server. The information regarding the selected online service may be a selection signal indicating that the online service is selected to be logged into. The first authentication information may be a unity password. Also, the terminal may further transmit unique ID information thereof, e.g., telephone numbers, for performing user authentication, to the server.

In step 320, the terminal receives second authentication information, which is detected based on the transmitted information, from the server. The server transmits second authentication information corresponding to the selected online service to the terminal, based on the information received from the terminal. The second authentication information may be an ID and password for logging into the online service.

In step 330, the terminal is automatically logged into the selected online service, based on the second authentication information.

FIG. 4 is a diagram which illustrates interface screens displaying a method of connecting to an online service, according to an embodiment of the present invention. Referring to FIG. 4, a service request interface screen 400 displays 'tumblr' 401, 'facebook' 402, and 'twitter' 403 as selectable online services. If a user selects 'twitter' 403 to log into, then the service request interface screen 400 is switched to a unity password input interface screen 410. In this case, the user is automatically logged into 'twitter' 403 and unity password input interface screen 410 is switched to a twitter service screen 420 by simply inputting a unity password only once. Similarly, if the user selects 'tumblr' 401 or 'facebook' 402 to log into, the service request interface screen 400 is also switched to the unity password input interface screen 410. Thus, the user may be automatically logged into 'tumblr' 401, 'facebook' 402, and 'twitter' 403 by simply inputting the unity password once without having to individually input IDs and passwords corresponding to 'tumblr' 401, 'facebook' 402, and 'twitter' 403.

FIG. 5 is a flowchart illustrating a method of connecting to an online service, according to another embodiment of the present invention. In FIG. 3, a terminal performs connecting to an online service, whereas, in FIG. 5, a server performs connecting to an online service.

Referring to FIG. 5, in step 510, the server receives information regarding a selected online service and first authentication information from the terminal. The information regarding the selected online service may be a selection signal indicating that the online service is selected to be logged into, and the first authentication information may be a unity password. The server may further receive unique ID information of the terminal, e.g., telephone numbers, for performing user authentication from the terminal.

In step 520, the server detects second authentication information for logging into the selected online service, based on the received information. Specifically, the server performs user authentication according to the first authentication information, and detects second authentication information for logging into the selected online service, based on the information regarding the selected online service. The server may use the first authentication information and the unique ID information regarding the terminal to perform user authentication. The second authentication information may be an ID and password for logging into the online service.

In step 530, the server transmits the detected second authentication information to the terminal.

Figure 6:
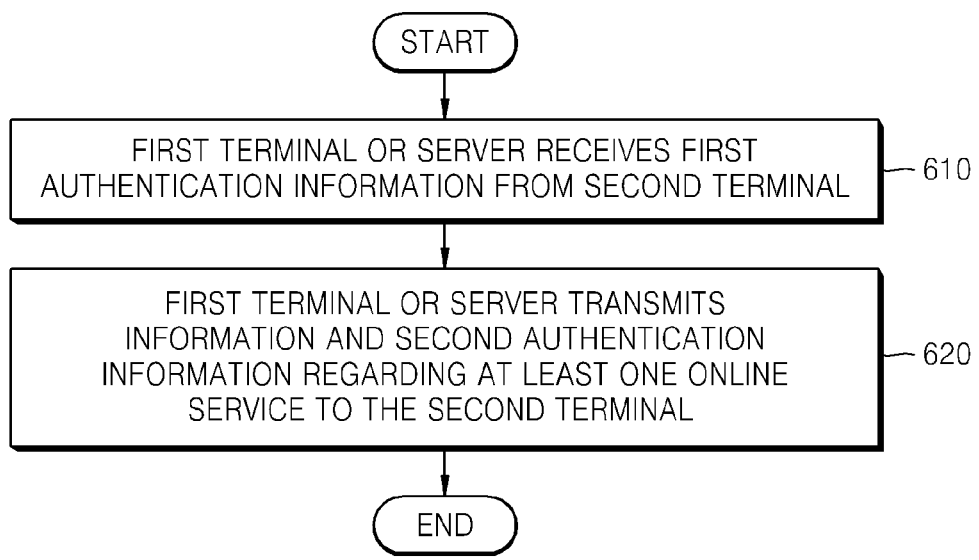
FIG. 6 is a flowchart illustrating a synchronization process for connecting to an online service, according to an embodiment of the present invention.

FIG. 6 is a flowchart illustrating a synchronization process for connecting to an online service, according to an embodiment of the present invention. Referring to FIG. 6, in step 610, a first terminal or a server receives first authentication information from a second terminal. The first terminal and the second terminal, or the server and the second terminal are connected via wireless network, e.g., Wi-Fi or Bluetooth®, or via predetermined wired/wireless communication network, e.g., the Internet. The first terminal authenticates a user of the second terminal based on first authentication information received from the second terminal. The server also authenticates the user of the second terminal based on first authentication information received from the second terminal. The server may further receive unique ID information regarding the second terminal from the second terminal. In this case, the server authenticates the user of the second terminal, based on both the first authentication information and the unique ID information.

In step 620, the first terminal or the server transmits information and second authentication information regarding at least one online service, which are stored in a storage unit or database therein, to the second terminal. The second authentication information may be an ID and password for logging into the online service.

Figure 7:
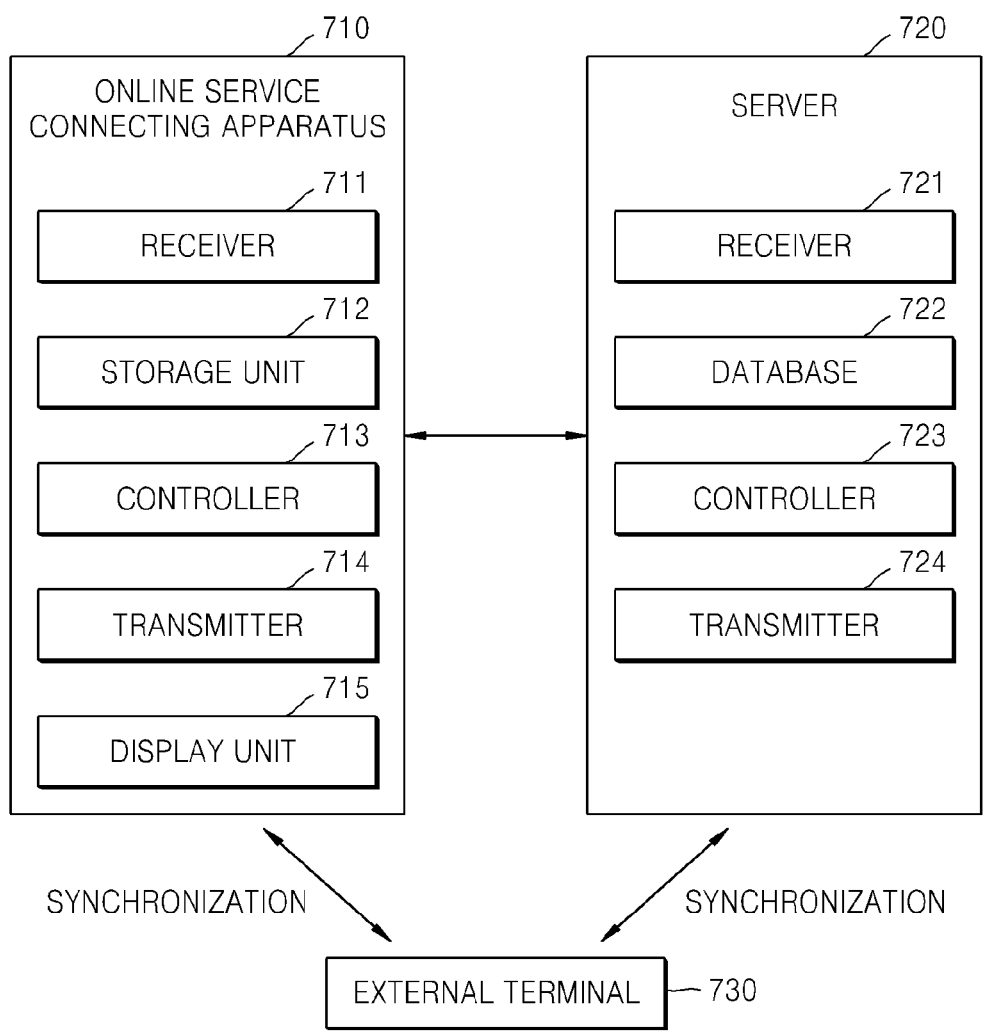
FIG. 7 is a block diagram of a system for connecting to an online service, according to an embodiment of the present invention.

FIG. 7 is a block diagram of a system for connecting to an online service, according to an embodiment of the present invention. Referring to FIG. 7, the system includes an online service connecting apparatus 710, a server 720, and an external terminal 730. The online service connecting apparatus 710 includes a receiver 711, a storage unit 712, a controller 713, a transmitter 714, and a display unit 715. The server 720 includes a receiver 721, a database 722, a controller 723, and a transmitter 724. Here, first authentication information may be a unity password, whereby a user may log into a plurality of online services without having to individually input authentication information corresponding to the plurality of online services, and the second authentication information may be, for example, an ID and password for logging into at least one online service. The ID may be a user name or email account according to a type of online service.

A method of registering the first authentication information and the second authentication information with the online service connecting apparatus 710 and the server 720, according to an embodiment of the present invention, is described below.

A user selects one from among several online services that may be supported by the online service connecting apparatus 710, displayed on the display unit 715 of the online service connecting apparatus 710, and then inputs second authentication information regarding the selected online service. If an ID and password for the selected online service have already been stored, they may be changed by inputting new second authentication information. In the online service connecting apparatus 710, the controller 713 stores first authentication information and the second authentication information input from a user in the storage unit 712 in the form of a data field. Then, the transmitter 714 transmits the first authentication information and second authentication information to the server 720. The transmitter 714 may further transmit unique ID information for the online service connecting apparatus 710 for authenticating a user of the online service connecting apparatus 710, to the server 720. If the online service connecting apparatus 710 is a mobile device, the unique ID information may be telephone numbers. Thereafter, the controller 723 of the server 720 completes authentication of the user of the online service connecting apparatus 710, and stores the received first authentication information, second authentication information, and unique ID information in the database 722 of the server 720 in the form of a data field. The authentication may be performed by using an SMS or email.

First and second methods of connecting to an online service, performed by the online service connecting apparatus 710, according to embodiments of the present invention, are described below.

In the first method, an online service is connected to, based on information stored in the online service connecting apparatus 710. In the online service connecting apparatus 710, the receiver 711 receives information regarding an online service selected by a user and first authentication information. The information regarding the selected online service may be a selection signal indicating that the online service is selected to be logged into.

The controller 713 compares the received first authentication information with first authentication information stored in the storage unit 712. If the received first authentication information and the stored first authentication information are the same, the controller 713 performs user authentication. After the user authentication, the controller 713 determines second authentication information corresponding to the selected online service, stored in the storage unit 712. Then, the controller 713 is automatically logged into the selected online service, based on the determined second authentication information.

In the second method, an online service is connected to, based on second authentication information stored in the server 720. In the online service connecting apparatus 710, the transmitter 711 transmits information regarding an online service selected by a user and first authentication information to the receiver 721 of the server 720. The transmitter 711 may further transmit unique ID information regarding the online service connecting apparatus 710, e.g., telephone numbers, for authenticating a user of the online service connecting apparatus 710, to the receiver 721.

The controller 723 of the server 720 detects second authentication information for logging into the selected online service, based on the received information. Specifically, the controller 723 performs user authentication by comparing the received first authentication information with first authentication information stored in the database 722 of the server 720, and detects second authentication information for logging into the selected online service, which is stored in the database 722, based on the information regarding the selected online service. The controller 723 may perform user authentication by using the received first authentication information and unique ID information. Then, the transmitter 724 of the server 720 transmits the detected second authentication information to the online service connecting apparatus 710.

The receiver 711 of the online service connecting apparatus 710 receives the second authentication information from the server 720, and the controller 713 is automatically logged into the selected online service, based on the second authentication information.

A synchronization process performed between either the online service connecting apparatus 710 or the server 720 and the external terminal 730 according to an embodiment of the present invention is described below.

The online service connecting apparatus 710 and the external terminal 730 may be connected via wireless network, such as Wi-Fi or Bluetooth®. In the online service connecting apparatus 710, the receiver 711 receives first authentication information from the external terminal 730. If the received first authentication information is the same as first authentication information stored in the storage unit 712, the controller 713 authenticates a user of the external terminal 730. Then, the transmitter 724 transmits information and second authentication information regarding at least one online service, which are stored in the storage unit 712, to the external terminal 730.

The server 720 and the external terminal 730 may be connected via predetermined wired/wireless communication network, such as the Internet. In the server 720, the receiver 721 receives first authentication information from the external terminal 730. The receiver 721 may further include unique ID information regarding the external terminal 730 to perform user authentication.

The controller 723 performs user authentication by comparing the received first authentication information with first authentication information stored in the database 722. Otherwise, the controller 723 may perform user authentication based on the received first authentication information and unique ID information. Then, the transmitter 724 transmits information and second authentication information regarding at least one online service, which are stored in the database 724, to the external terminal 730.

The methods for connecting to an online service according to the above embodiments can be implemented as computer readable codes in a non-transitory computer readable medium where the computer readable medium may be any recording apparatus capable of storing data that is read by a computer system, e.g., a Read-Only Memory (ROM), a Random Access Memory (RAM), a Compact Disc (CD)-ROM, a magnetic tape, a floppy disk, an optical data storage device, and so on. The computer readable medium can be distributed among computer systems that are interconnected through a network, and the present invention may be stored and implemented as computer readable code in the distributed system. Also, functional programs, codes, and code segments for performing the above methods may be easily derived by programmers in the technical field of the present invention.

While the present invention has been shown and described with reference to various embodiments thereof, it will be understood by those of ordinary skill in the art that various changes in form and detail may be made therein without departing from the spirit and scope of the present invention as defined by the appended claims.

What is claimed is:

1. A method of connecting to an online service, performed by a terminal, the method comprising:
  displaying a service list of online services and receiving a user input to select an online service from the service list;
  displaying a first authentication input screen in response to the selection of the online service from the service list;
  receiving a user input to input first authentication information except a user identification (ID), wherein the first authentication information comprises a unity password;
  transmitting the first authentication information and information regarding the online service selected from the service list to an external device;
  receiving second authentication information corresponding to the first authentication information and information regarding the selected online service, from the external device, the second authentication information including the user ID and password for logging into the selected online service; and
  logging into the selected online service using the received second authentication information,
  wherein one entry of the unity password enables logging into each of the plurality of online services.

2. The method of claim 1, further comprising transmitting unique terminal ID information regarding the terminal to the external device.

3. The method of claim 1, further comprising storing information regarding at least one online service, the first authentication information, the second authentication information regarding the at least one online service, and unique terminal ID information of the terminal.

4. A method of providing authentication information for connecting to an online service, the method comprising:
  receiving first authentication information except a user identification (ID), and information regarding an online service selected by user input from a service list displayed on a terminal, from the terminal, wherein the first authentication information comprises a unity password and is input in response to the selection of an online service from the service list;
  detecting second authentication information corresponding to the first authentication information and information regarding the selected online service, the second authentication information including the user ID and password for logging into the selected online service; and
  transmitting the detected second authentication information to the terminal, wherein one entry of the unity password enables logging into each of the plurality of online services, wherein the first authentication information except the user ID is input to the terminal by a user.

5. The method of claim 4, further comprising receiving unique terminal ID information regarding the terminal from the terminal.

6. The method of claim 5, wherein detecting the second authentication information comprises:
- authenticating the terminal based on the unique terminal ID information and the first authentication information; and
- if the terminal is authenticated, detecting the second authentication information for logging into the selected online service, based on the information regarding the selected online service.

7. The method of claim 4, further comprising:
- receiving information regarding at least one online service, the first authentication information, the second authentication information regarding the at least one online service, and unique terminal ID information regarding the terminal, from the terminal; and
- storing the received information regarding the at least one online service, the first authentication information, the second authentication information regarding the at least one online service, and the unique terminal ID information.

8. The method of claim 7, further comprising if the first authentication information is received from an external terminal, transmitting the stored information and the second authentication information regarding the at least one online service to the external terminal.

9. The method of claim 8, wherein transmitting the second authentication information to the external terminal comprises:
- receiving the first authentication information and the unique terminal ID information regarding the external terminal from the external terminal;
- authenticating the external terminal based on the information received from the external terminal; and
- if the external terminal is authenticated, transmitting the stored information and the second authentication information regarding the at least one online service to the external terminal.

10. A method of connecting to an online service, performed by a terminal, the method comprising:
- displaying a service list of online services and receiving a user input to select an online service from the service list;
- displaying a first authentication input screen in response to the selection of the online service from the service list;
- receiving a user input to input first authentication information except a user identification (ID), wherein the first authentication information comprises a unity password;
- receiving information regarding the online service selected from the service list;
- determining second authentication information corresponding to the first authentication information and information regarding the selected online service, the second authentication information including the user ID and password for logging into the selected online service;
- logging into the selected online service using the determined second authentication information; and
- transmitting unique terminal ID information regarding the terminal to a server, wherein one entry of the unity password enables logging into each of the plurality of online services.

11. The method of claim 10, further comprising storing information regarding at least one online service, the first authentication information, and the second authentication information regarding the at least one online service.

12. The method of claim 10, further comprising transmitting information regarding at least one online service, the first authentication information, and the second authentication information to the server.

13. The method of claim 11, further comprising if the first authentication information is received from an external terminal, transmitting the information and the second authentication information regarding the at least one online service to the external terminal.

14. A method of providing authentication information for connecting to an online service, the method comprising:
- receiving first authentication information except a user identification (ID), second authentication information, and information regarding at least one online service displayed on a terminal, from the terminal, wherein the first authentication information comprises a unity password;
- storing the received first authentication information, second authentication information, and information regarding the at least one online service; and
- if the first authentication information and information regarding an online service selected by user input from the at least one online service is received from an external terminal, transmitting the second authentication information corresponding to the first authentication information and information regarding the selected online service, to the external terminal, the transmitted second authentication information including the user ID and password for logging into the selected online service, wherein one entry of the unity password enables logging into each of the plurality of online services, wherein the first authentication information is input in response to the selection of the online service from the service list, and wherein the first authentication information except the user ID is input to the terminal by a user.

15. The method of claim 14, wherein transmitting the second authentication information to the external terminal comprises:
- receiving the first authentication information and unique terminal ID information regarding the external terminal from the external terminal;
- authenticating the external terminal based on the information received from the external terminal; and
- if the external terminal is authenticated, transmitting the stored information and the second authentication information regarding the at least one online service to the external terminal.

16. An apparatus for connecting to an online service, the apparatus comprising:
- a display which displays a service list of online services and a first authentication input screen in response to an online service being selected from the service list;
- an input interface which receives a user input to select an online service from the displayed service list, and receives a user input to input first authentication information except a user identification (ID), wherein the first authentication information comprises a unity password;
a communication interface which transmits the first authentication information, unique terminal ID information and information regarding the online service selected from the service list regarding the terminal to an external device, and receives second authentication information corresponding to the first authentication information and information regarding the selected online service, from the external device, the second authentication information including the user ID and password for logging into the selected online service; and
a processor which logs into the selected online service using the received second authentication information,
wherein one entry of the unity password enables logging into each of the plurality of online services.

17. The apparatus of claim 16, wherein the communication interface further transmits information regarding at least one online service, the first authentication information, and the second authentication information regarding the at least one online service to the external device.

18. An apparatus for providing authentication information for connecting to an online service, the apparatus comprising:
a communication interface for receiving first authentication information except a user identification (ID), and information regarding an online service selected by user input from a service list displayed on a terminal, from the terminal, wherein the first authentication information comprises a unity password; and
a processor for detecting second authentication information corresponding to the first authentication information and information regarding the selected online service, the second authentication information including the user ID and password for logging into the selected online service,
wherein the first authentication information is input in response to the selection of the online service from the service list,
wherein the communication interface transmits the detected second authentication information to the terminal,
wherein one entry of the unity password enables logging into each of the plurality of online services, and
wherein the first authentication information except the user ID is input to the terminal by a user.

19. The apparatus of claim 18, wherein the communication interface further receives unique terminal ID information regarding the terminal from the terminal.

20. The apparatus of claim 19, wherein the processor authenticates the terminal based on the unique terminal ID information and the first authentication information, and detects the second authentication information for automatically logging into the selected online service, based on the information regarding the selected online service, when the terminal is authenticated.

21. The apparatus of claim 18, further comprising:
a database for storing the received information regarding at least one online service, the first authentication information, the second authentication information, and unique terminal ID information regarding the terminal.

22. The apparatus of claim 21, wherein the communication interface receives the first authentication information from an external terminal, and transmits the information and the second authentication information regarding the at least one online service, which are stored in the database, to the external terminal.

23. The apparatus of claim 22, wherein the communication interface receives the first authentication information and the unique terminal ID information regarding the external terminal from the external terminal, the processor authenticates the external terminal based on the information received from the external terminal, and the communication interface transmits the stored information and the second authentication information regarding the at least one online service to the external terminal, when the external terminal is authenticated.

24. An apparatus for connecting to an online service, the apparatus comprising:
an input interface for receiving a user input to input first authentication information except a user identification (ID), and information regarding at least one online service displayed on a terminal, from the terminal, wherein the first authentication information comprises a unity password;
a processor for determining second authentication information corresponding to the first authentication information and information regarding an online service selected by a user input, and logging into the selected online service using the determined second authentication information, the second authentication information including the user ID and password for logging into the selected online service; and
a communication interface for transmitting unique terminal ID information regarding the terminal to a server,
wherein the first authentication information is input in response to the selection of the online service from the service list, and
wherein one entry of the unity password enables logging into each of the plurality of online services.

25. The apparatus of claim 24, further comprising:
a storage unit for storing information regarding at least one online service, the first authentication information, and the second authentication information regarding the at least one online service.

26. The apparatus of claim 24, wherein the communication interface transmits information regarding at least one online service, the first authentication information, and the second authentication information to the server.

27. An apparatus for connecting to an online service, the apparatus comprising:
a display which displays a service list of online services and a first authentication input screen in response to an online service being selected from the service list;
a communication interface which receives a user input to select an online service from the displayed service list, and receives first authentication information except a user identification (ID), and information regarding the selected online service, from a terminal, wherein the first authentication information comprises a unity password;
a database for storing the received first authentication information and information regarding the selected online service; and
a processor for detecting second authentication information corresponding to the first authentication information and information regarding the selected online service, which are stored in the database, the detected second authentication information including the user ID and password for logging into the selected online service, when the receiver receives the first authentication information from an external terminal, wherein the communication interface transmits the detected information and second authentication information regarding the selected online service to the external terminal, wherein the first authentication information is input in response to the selection of the online service from the service list, wherein one entry of the unity password enables logging into each of the plurality of online services, and wherein the first authentication information except the user ID is input to the terminal by a user.

28. The apparatus of claim 27, wherein the communication interface receives the first authentication information and unique terminal ID information regarding the external terminal from the external terminal, the processor authenticates the external terminal based on the information received from the external terminal, and the communication interface transmits the stored information and the second authentication information regarding the at least one online service to the external terminal when the external terminal is authenticated.

29. A non-transitory computer readable recording medium having recorded thereon a computer program for executing a method of connecting to an online service, performed by a terminal, the method comprising:

displaying a service list of online services and receiving a user input to select an online service from the service list;

displaying a first authentication input screen in response to the selection of the online service from the service list;

receiving a user input to input first authentication information except a user identification (ID), wherein the first authentication information comprises a unity password;

transmitting information regarding the online service selected from the service list and first authentication information to an external device;

receiving second authentication information regarding the selected online service detected based on the transmitted information, from the external device; and logging into the selected online service using the received second authentication information, wherein one entry of the unity password enables logging into each of the plurality of online services.

30. A non-transitory computer readable recording medium having recorded thereon a computer program for executing a method of providing authentication information for connecting to an online service, the method comprising:

receiving, from a terminal, information regarding an online service selected by user input from a service list displayed on a terminal, and first authentication information except a user identification (ID), wherein the first authentication information comprises a unity password and is input in response to the selection of the online service from the service list;

detecting second authentication information regarding the selected online service used to log into the selected online service, based on the received information; and transmitting the detected second authentication information to the terminal, wherein one entry of the unity password enables logging into each of the plurality of online services, and wherein the first authentication information except the user ID is input to the terminal by a user.

31. A non-transitory computer readable recording medium having recorded thereon a computer program for executing a method of connecting to an online service, the method comprising:

displaying a service list of online services and receiving a user input to select an online service from the service list;

displaying a first authentication input screen in response to the selection of the online service from the service list;

receiving a user input to input first authentication information except a user identification (ID), wherein the first authentication information comprises a unity password;

receiving information regarding the online service selected from the service list;

determining second authentication information corresponding to the first authentication information and information regarding the selected online service, the second authentication information including the user ID and password for logging into the selected online service;

logging into the selected online service using the determined second authentication information; and transmitting unique terminal ID information regarding the terminal to a server, wherein one entry of the unity password enables logging into each of the plurality of online services.

32. A non-transitory computer readable recording medium having recorded thereon a computer program for executing a method of providing authentication information for connecting to an online service, the method comprising:

receiving first authentication information except a user identification (ID), second authentication information, and information regarding at least one online service displayed on a terminal, from the terminal, wherein the first authentication information comprises a unity password;

storing the received first authentication information, second authentication information, and information regarding the at least one online service; and if the first authentication information and information regarding an online service selected by user input from the at least one online service is received from an external terminal, transmitting the second authentication information corresponding to the first authentication information and information regarding the selected online service, to the external terminal, the transmitted second authentication information including the user ID and password for logging into the selected online service, wherein the first authentication information is input in response to the selection of the online service from the service list, wherein one entry of the unity password enables logging into each of the plurality of online services, and wherein the first authentication information except the user ID is input to the terminal by a user.

* * * * *